United States Patent
Hempstead et al.

(10) Patent No.: US 11,773,016 B2
(45) Date of Patent: Oct. 3, 2023

(54) DIFFUSE REFLECTOR AND METHODS OF USE

(71) Applicant: CORNING INCORPORATED, Corning, NY (US)

(72) Inventors: Martin Hempstead, Painted Post, NY (US); Stephan Lvovich Logunov, Corning, NY (US)

(73) Assignee: Corning Incorporated, Corning, NY (US)

( * ) Notice: Subject to any disclaimer, the term of this patent is extended or adjusted under 35 U.S.C. 154(b) by 703 days.

(21) Appl. No.: 16/687,899

(22) Filed: Nov. 19, 2019

(65) Prior Publication Data

US 2020/0192024 A1    Jun. 18, 2020

Related U.S. Application Data

(60) Provisional application No. 62/779,925, filed on Dec. 14, 2018.

(51) Int. Cl.
*C03C 25/6226* (2018.01)
*C03C 25/106* (2018.01)
*G02B 5/02* (2006.01)

(52) U.S. Cl.
CPC ........ *C03C 25/6226* (2013.01); *C03C 25/106* (2013.01); *G02B 5/0226* (2013.01)

(58) Field of Classification Search
CPC ...... H04N 1/4051; H04N 1/4057; H04N 1/52; C03C 25/106; C03C 25/12; C03C 25/6226; G02B 5/0226
See application file for complete search history.

(56) References Cited

U.S. PATENT DOCUMENTS

| | | | |
|---|---|---|---|
| 6,144,536 A | 11/2000 | Zimmerman et al. |
| 6,869,206 B2 | 3/2005 | Zimmerman et al. |
| 7,021,797 B2 | 4/2006 | Minano et al. |
| 7,511,281 B2 | 3/2009 | Cooper |

(Continued)

FOREIGN PATENT DOCUMENTS

| | | | |
|---|---|---|---|
| CN | 105579763 A | 5/2016 |
| CN | 105607351 A | 5/2016 |

(Continued)

OTHER PUBLICATIONS

International Search Report and Written Opinion of the European International Searching Authority; PCT/S2019/064116; dated Mar. 11, 2020; 13 Pgs.

(Continued)

*Primary Examiner* — Joseph P Martinez
*Assistant Examiner* — Vipin Patel
(74) *Attorney, Agent, or Firm* — Kevin L. Bray

(57) ABSTRACT

An apparatus for curing a coating composition disposed on a glass fiber includes a diffuse reflector surrounding a coating composition disposed on a glass fiber. The diffuse reflector defines a cavity having a sidewall extending from a first end to a second end. The first end has a first opening and the second end has a second opening. The glass fiber passes through the cavity from the first opening to the second opening. The sidewall has an interior surface facing the coating composition disposed on the glass fiber. The interior surface includes a scattering material. A light source integrated with the diffuse reflector. The light source directs light to the scattering material. The scattering material diffusely reflects at least 90% of the light. The diffusely reflected light has sufficient intensity to cure the coating composition.

14 Claims, 11 Drawing Sheets

(56) References Cited

U.S. PATENT DOCUMENTS

| | | | |
|---|---|---|---|
| 7,722,211 | B2 | 5/2010 | Marra et al. |
| 7,875,247 | B2 | 1/2011 | Clark et al. |
| 8,854,734 | B2 | 10/2014 | Ingram |
| 9,057,499 | B2 | 6/2015 | Livesay et al. |
| 9,062,854 | B2 | 6/2015 | Livesay et al. |
| 2005/0063881 | A1 | 3/2005 | Senne et al. |
| 2005/0115498 | A1 | 6/2005 | Ingram et al. |
| 2008/0231958 | A1 | 9/2008 | Fry et al. |
| 2012/0315184 | A1 | 12/2012 | Clark |
| 2014/0091230 | A1 | 4/2014 | Clark et al. |
| 2017/0191754 | A1 | 7/2017 | Jing et al. |
| 2017/0207372 | A1* | 7/2017 | Hawtof ................ H01L 33/483 |
| 2019/0249846 | A1* | 8/2019 | Nakajima ............. C03C 25/106 |

FOREIGN PATENT DOCUMENTS

| | | | | | |
|---|---|---|---|---|---|
| EP | 1974166 | A2 | | 10/2008 | |
| EP | 2388239 | A1 | | 11/2011 | |
| JP | 2018035050 | A | * | 3/2018 | ............ B41J 11/002 |
| KR | 2016-0030225 | A | | 3/2016 | |
| WO | 2005114265 | A1 | | 12/2005 | |
| WO | 2007/082021 | A2 | | 7/2007 | |
| WO | 2010039945 | A2 | | 4/2010 | |
| WO | WO-2012116215 | A1 | * | 8/2012 | ........... G02B 6/0043 |
| WO | 2015/006593 | A1 | | 1/2015 | |
| WO | 2015/066703 | A2 | | 5/2015 | |
| WO | 2015/066730 | A1 | | 5/2015 | |

OTHER PUBLICATIONS

Kirk T. McDonald, "Intensity, Brightness and Etendué of an Aperture Lamp" Joseph Henry Laboratories, Princeton University, Princeton, NJ 08544 (Dec. 8, 2012; updated Feb. 25, 2013) 25 PGS.

Chinese Patent Application No. 201980082902.5, Office Action dated Sep. 1, 2022, 4 pages (English Translation only), Chinese Patent Office.

* cited by examiner

DIFFUSE REFLECTOR AND METHODS OF USE

This application claims the benefit of priority to U.S. Provisional Application Ser. No. 62/779,925 filed on Dec. 14, 2018, the content of which is relied upon and incorporated herein by reference in its entirety.

BACKGROUND

Field

The present specification generally relates to diffuse reflector apparatuses and, in particular, to diffuse reflector apparatuses and methods of using diffuse reflector apparatuses for curing glass fiber coatings.

Technical Background

Polymer coatings are applied to glass fibers as the glass fibers are drawn. On early draw towers, curing of the polymer coatings was achieved by heating a liquid coating composition disposed on the surface of a glass fiber. For the last couple decades, intense ultraviolet light sources have been used to cure the coating compositions to form polymer coatings on glass fibers. Until recently, these light sources were often mercury-plasma lamps, excited by microwave energy, but ultraviolet light-emitting diodes are gaining favor. The light-emitting diodes offer compactness and lower energy consumption, both directly through reduction of drive power and indirectly through reducing or eliminating the need for flows of cooling air required for mercury-plasma lamps.

Current systems for curing coating compositions on glass fibers during drawing employ shaped specular focusing mirrors, typically elliptical cylinders, to create a zone of high intensity at the surface of the coating composition disposed on the glass fiber. Specular reflectance as a mechanism for curing is inefficient because much of the light intensity emanating from the light source is reflected away from the optical fiber and is not absorbed by the coating composition. Specular reflectance also produces a light field that has strong variations in intensity in the azimuthal direction, which imposes tight tolerances on the placement of the glass fiber relative to the light source to insure maximum light intensity at the surface of the coating composition. Even when the glass fiber is well aligned with the light source, azimuthal variations in light intensity around the circumference of the coating composition remain and lead to non-uniformities in the degree of curing.

There remains a need for improved mechanisms for efficiently coupling light from lamps and light-emitting diodes to effect curing of coating compositions disposed on glass fibers in the draw processes used to manufacture optical fibers.

SUMMARY

The present disclosure provides a diffuse reflector for directing light from a light source to a coating composition disposed on a glass fiber. The diffuse reflector includes a sidewall with a surface that scatters light from a light source to direct the light to the coating composition. The primary mechanism of coupling of light from the light source to the coating composition is diffuse reflectance. Diffuse reflectance offers a number of advantages over specular reflectance, including increased efficiency of light coupling, light recycling to redirect light that bypasses the coating composition back to the coating composition, higher intensity of light at the surface of the coating composition, a reduction in the number and/or power of light sources, and a reduction in the cooling load of light sources.

In one or more aspects of the present disclosure, a diffuse reflector apparatus comprises: a reflector body comprising a sidewall and a cavity that extends between ends of the sidewall, the reflector body comprising a diffuse reflective inner surface that defines the cavity having a reflectivity of 0.97 or greater in an ultraviolet wavelength range.

In one or more aspects of the present disclosure, a method of forming a diffuse reflector apparatus comprises: forming a reflector body using a fused silica soot such that the reflector body has a density of from 0.8 g/cm$^3$ to 1.8 g/cm$^3$; and forming a cavity from one end of the reflector body to an opposite end of the reflector body, the cavity defined by a diffuse reflective inner surface of the reflector body having a reflectivity of 0.99 or greater in an ultraviolet wavelength range.

In one or more aspects of the present disclosure, a method of coating an optical fiber with an optical fiber coating including an ultraviolet curable polymer, the method comprising: coating an optical fiber with the optical fiber coating; delivering the optical fiber with the optical fiber coating to a cavity of a diffuse reflector apparatus, the diffuse reflector apparatus comprising a reflector body comprising a sidewall and the cavity that extends between ends of the sidewall, the reflector body comprising a diffuse reflective inner surface that defines the cavity having a reflectivity of 0.97 or greater in an ultraviolet wavelength range; and curing the optical fiber coating using ultraviolet light delivered into the cavity.

The present disclosure extends to:

An apparatus for curing a coating composition disposed on a glass fiber, comprising:
  a diffuse reflector surrounding a coating composition disposed on a glass fiber, the diffuse reflector defining a cavity having a sidewall extending from a first end to a second end, the first end having a first opening and the second end having a second opening, the glass fiber passing through the cavity from the first opening to the second opening, the sidewall having an interior surface facing the coating composition disposed on the glass fiber, the interior surface comprising a scattering material; and a light source integrated with the diffuse reflector, the light source directing light to the scattering material, the scattering material having a diffusely reflecting at least 90% of the light, the diffusely reflected light having sufficient intensity to cure the coating composition.

The present disclosure extends to:

A method of curing a coating composition on a glass fiber, comprising:
  directing a glass fiber through an opening into a cavity of a diffuse reflector, the glass fiber having a coating composition disposed thereon, the cavity having an interior surface comprising a scattering material; and
  directing light to the coating composition, the directing including diffusely reflecting the light from the scattering material, the scattering material having a diffuse reflectivity of at least 90% at a wavelength of the light, the diffusely reflected light having sufficient intensity to cure the coating composition.

It is to be understood that both the foregoing general description and the following detailed description describe various embodiments and are intended to provide an over-view or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
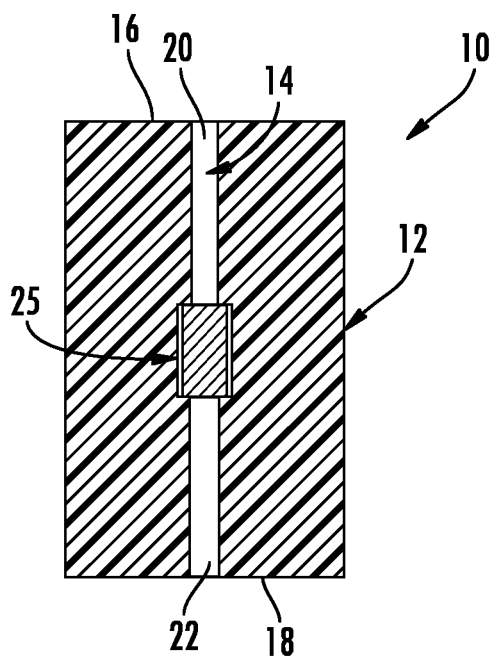
FIG. 1 is a diagrammatic, section view of a diffuse reflector formed of a fused silica soot for curing optical fiber coatings, according to one or more embodiments shown and described herein.

Reference will now be made in detail to embodiments of diffuse reflector apparatuses and method of using the diffuse reflector apparatuses. Whenever possible, the same reference numerals will be used throughout the drawings to refer to the same or like parts.

In this specification and in the claims which follow, reference will be made to a number of terms which shall be defined to have the following meanings:

"Include," "includes," "including", or like terms means encompassing but not limited to, that is, inclusive and not exclusive.

Directional terms as used herein—for example up, down, right, left, front, back, top, bottom—are made only with reference to the figures as drawn and the coordinate axis provided therewith and are not intended to imply absolute orientation.

Unless otherwise expressly stated, it is in no way intended that any method set forth herein be construed as requiring that its steps be performed in a specific order, nor that specific orientations be required with any apparatus. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

"Optical fiber" refers to a waveguide having a glass portion surrounded by a coating. The glass portion includes a core and a cladding, and is referred to herein as a "glass fiber".

"Ultraviolet" or "UV" refers to wavelengths in the range from 200 nm-400 nm.

Optical Fiber Draw Process.

In a continuous optical fiber manufacturing process, a glass fiber is drawn from a heated preform and sized to a target diameter (typically 125 μm). The glass fiber is then cooled and directed to a coating system that applies a liquid primary coating composition to the glass fiber. Two process options are viable after application of the liquid primary coating composition to the glass fiber. In one process option (wet-on-dry process), the liquid primary coating composition is cured to form a solidified primary coating, the liquid secondary coating composition is applied to the cured primary coating, and the liquid secondary coating composition is cured to form a solidified secondary coating. In a second process option (wet-on-wet process), the liquid secondary coating composition is applied to the liquid primary coating composition, and both liquid coating compositions are cured simultaneously to provide solidified primary and secondary coatings. After the fiber exits the coating system, the fiber is collected and stored at room temperature. Collection of the fiber typically entails winding the fiber on a spool and storing the spool.

In some processes, the coating system further applies a tertiary coating composition to the secondary coating and cures the tertiary coating composition to form a solidified tertiary coating. Typically, the tertiary coating is an ink layer used to mark the fiber for identification purposes and has a composition that includes a pigment and is otherwise similar to the secondary coating. The tertiary coating is applied to the secondary coating and cured. The secondary coating has typically been cured at the time of application of the tertiary coating. The primary, secondary, and tertiary coating compositions can be applied and cured in a common continuous manufacturing process. Alternatively, the primary and secondary coating compositions are applied and cured in a common continuous manufacturing process, the coated fiber is collected, and the tertiary coating composition is applied and cured in a separate offline process to form the tertiary coating.

A coating composition applied to a glass fiber is said herein to be disposed on the glass fiber. As used herein, "disposed on" means in contact with, where contact refers to direct contact or indirect contact. A primary coating is disposed on a glass fiber and is in direct contact with the glass fiber. A secondary coating is disposed on a glass fiber, disposed on a primary coating, in indirect contact with a glass fiber, and in direct contact with a primary coating. A tertiary coating is disposed on a glass fiber, disposed on a primary coating, disposed on a secondary coating, in indirect contact with a glass fiber, in indirect contact with a primary coating, and in direct contact with a secondary coating.

The primary, secondary, and tertiary coatings applied to glass fibers are formed from curable coating compositions. Curable coating compositions include one or more curable components. As used herein, the term "curable" is intended to mean that the component, when exposed to a suitable source of curing energy, includes one or more curable functional groups capable of forming covalent bonds that participate in linking the component to itself or to other components of the coating composition. The product obtained by curing a curable coating composition is referred to herein as the cured product of the composition or as a coating. The cured product is preferably a polymer. The curing process is induced by energy. Forms of energy include radiation or thermal energy. In a preferred embodiment, curing occurs with radiation, where radiation refers to electromagnetic radiation. Curing induced by radiation is referred to herein as radiation curing. A radiation-curable component is a component that can be induced to undergo a curing reaction when exposed to radiation of a suitable wavelength at a suitable intensity for a sufficient period of time. Suitable wavelengths include wavelengths in the infrared, visible, or ultraviolet portion of the electromagnetic spectrum. For purposes of the present disclosure, wavelengths in the ultraviolet (UV) are preferred.

A curable component includes one or more curable functional groups. Preferred curable functional groups include ethylenically unsaturated groups such as acrylate and methacrylate groups. Curable components include curable monomers and curable oligomers. In addition to curable monomers and/or curable oligomers, curable coating compositions typically include a photoinitiator and an additive. Additives include an adhesion promoter, a strength additive, an antioxidant, a catalyst, a stabilizer, an optical brightener, a property-enhancing additive, an amine synergist, a wax, a lubricant, and/or a slip agent. Secondary and/or tertiary coating compositions may also include a pigment.

A curable coating composition is disposed as a layer on the glass fiber. The thickness of the layer of curable coating composition is in the range from 1 µm-60 µm, or in the range from 5 µm-55 µm, or in the range from 10 µm-50 µm, or in the range from 15 µm-45 µm, or in the range from 20 µm-40 µm.

Curing Systems.

Preferred light sources for curing radiation-curable coating compositions include lamps (e.g. a mercury lamp) and light-emitting diodes (LEDs). The light sources emit curing radiation that is absorbed by the radiation-curable coating composition to initiate or advance a curing reaction. Preferred wavelengths for curing are wavelengths in the UV. The curing radiation from the light source includes one or a plurality of wavelengths. In one embodiment, the light source includes multiple LEDs and at least two of the LEDs emit at different wavelengths.

Light-emitting diodes (LEDs) are flat emitters that are typically bundled as arrays to provide a light source with sufficient power to cure. The arrays are flat and are formed as part of a wafer. To improve the efficiency of curing, it is necessary to maximize the fraction of light produced by LEDs made incident to the curable coating composition disposed on a glass fiber. This typically requires out-of-plane tilting of LEDs to properly direct light. Even in the tilted configuration, the intensity distribution of light at the curable coating composition may not be uniform or stable. To improve uniformity and consistency of the illumination field, precise control of the position of the glass fiber with respect to the LEDs. Typically, lamps and LEDs use imaging optics to couple output light to a coating composition disposed on a glass fiber. Imaging optics include focusing elements (e.g. lenses) and/or specular reflective elements (e.g. mirrors). Imaging optics are used to direct the output power of a light source to improve uniformity of illumination at the curable coating composition and to efficiently couple the output power to the curable coating composition. Coupling efficiency with imaging optics, however, remains low. In some examples, LED brightness approaching 200 W/cm$^2$ is required to produce less than 30 W/cm$^2$ at a curable coating composition disposed on a glass fiber in a typical fiber draw process when imaging optics are used for coupling.

In the present disclosure, a diffuse reflector is used to couple output power from a light source (lamp, LED or LED array) to a curable coating composition disposed on a glass fiber. Referring to FIG. 1, a diffuse reflector 10 for curing a curable coating composition disposed on a glass fiber to form an optical fiber coating includes a reflector body 12 having a cavity 14 that extends between opposite ends 16 and 18 of the reflector body 12. Light source 25 is integrated with cavity 14 and is centered along the length of cavity 14. Openings 20 and 22 are provided at the opposite ends 16 and 18 and permit entry and exit of a glass fiber into and out of the cavity 14. The cavity 14 may be circular, annular, arcuate, or polygonal in cross-sectional shape. The cross-sectional shape may be open or closed. For example, the cross-sectional shape may be open to provide an opening for insertion of a light source. In one embodiment, the cross-sectional shape is circular with a diameter of no greater than about 2 inches (50.8 mm), or no greater than about 1.5 inches (38.1 mm) or no greater than about 1 inch (25.4 mm), or no greater than about 0.5 inch (12.7 mm). In some embodiments, the diameter of the cavity 14 may be constant along an entire length of the cavity 14. The length of the cavity 14 is at least 50 cm, or at least 75 cm, or at least 100 cm, or at least 125 cm, or at least 150 cm, or in the range from 50 cm-250 cm, or in the range from 75 cm-225 cm, or in the range from 100 cm-200 cm. The length and diameter of the cavity 14 may be selected to receive a relatively narrow and relatively long structure, such as a glass fiber or a glass fiber having a curable coating composition disposed therein during an optical fiber draw process.

Figure 1A:
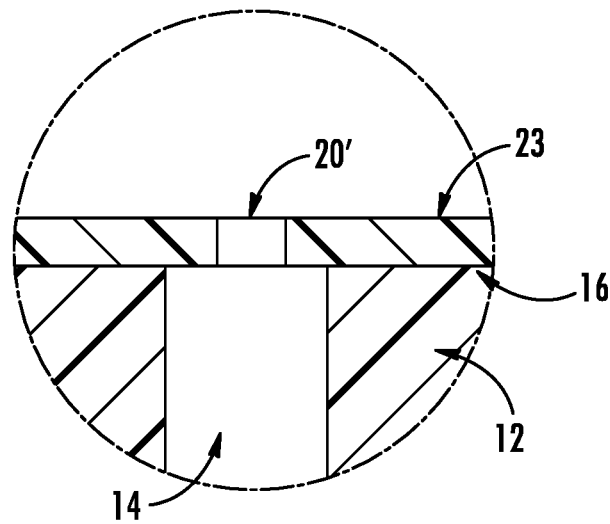
FIG. 1A illustrates a section view of the diffuse reflector of FIG. 1 including end caps, according to one or more embodiments shown and described herein.

Referring briefly to FIG. 1A, in some embodiments, openings 20' may be provided by end caps 23 and 24 located at the opposite ends 16 and 18 of the reflector body 12. While only end cap 23 is shown, the opposite end of the reflector body 12 may have the same or similar end cap. The openings 20' may have a diameter or cross-sectional area that is less than the diameter or cross-sectional area of the cavity 14. In some embodiments, the caps 23 may provide the reduced diameter to more efficiently trap a gas and allow for improved gas flow within the cavity 14. The end caps 23 may include a diffuse reflective material, as discussed below, particularly on cavity-facing surfaces to reduce light loss at the end caps 23 and improve intensity within the cavity 14.

Figure 1B:
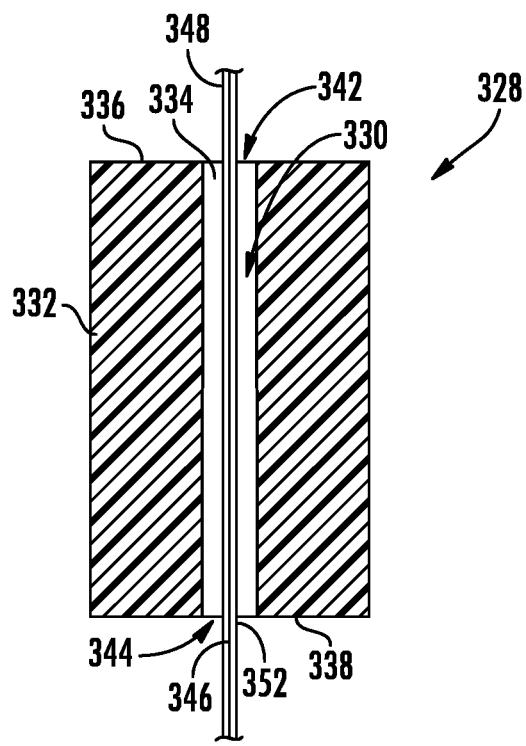
FIG. 1B illustrates a section view of a diffuse reflector according to one or more embodiments shown and described herein.

In some embodiments, the openings at the ends of the cavity have the same cross-sectional shape and same cross-sectional area as the cavity. FIG. 1B, for example, shows diffuse reflector 328 with cavity 330 having a sidewall 332 with interior surface 334 extending from end 336 to end 338. Sidewall 332 has an interior surface 340 facing the interior of the cavity 330. End 336 includes opening 342 and end 338 includes opening 344. Glass fiber 346 has a curable coating composition 348 disposed thereon and passes through cavity 330 past light source 350 to opening 344. Light source 350 provides curing radiation to cure curable coating composition 348 to form coating 352. Interior surface 334 faces glass fiber 346, curable coating composition 348, and coating 352. Glass fiber 346 exits cavity 330 through opening 344 with coating 352 disposed thereon. In the embodiment of FIG. 1B, opening 342 and opening 344 have the same cross-sectional shape and cross-sectional area as cavity 330. One or more light sources (not shown) are integrated with cavity 330.

Figure 1C:
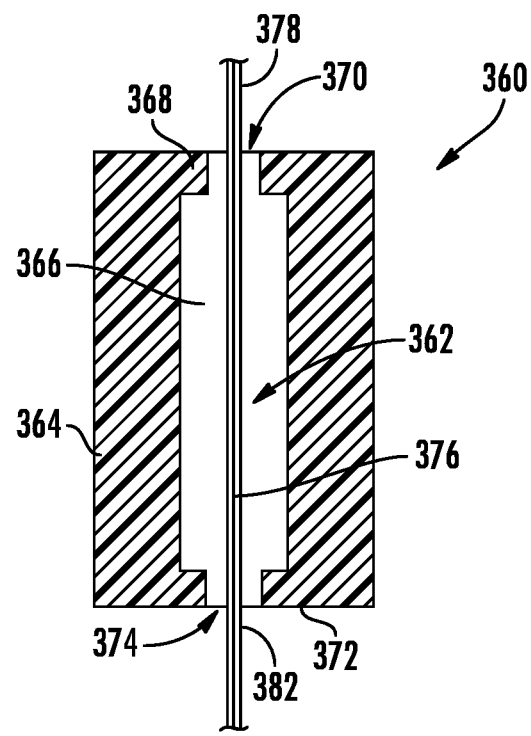
FIG. 1C illustrates a section view of a diffuse reflector according to one or more embodiments shown and described herein.

In other embodiments, the openings at the ends of the cavity differ in cross-sectional shape and/or cross-sectional area from cavity. FIG. 1C, for example, shows diffuse reflector 360 with cavity 362 having sidewall 364 with interior surface 366 facing the interior of cavity 362. Diffuse reflector 360 further includes end wall 368 with opening 370 and end wall 372 with opening 374. Opening 370 and opening 374 have a smaller cross-sectional area than cavity 362. Glass fiber 376 enters cavity 362 through opening 370 with a curable coating composition 378 disposed thereon and passes through cavity 362 past light source 380. Light source 380 provides curing radiation to cure curable coating composition 378 to form coating 382. Glass fiber 376 exits cavity 362 through opening 374 with coating 382 disposed thereon. Interior surface 366 faces glass fiber 376, curable coating composition 378, and coating 382. One or more light sources (not shown) are integrated with cavity 362.

Figure 1D:
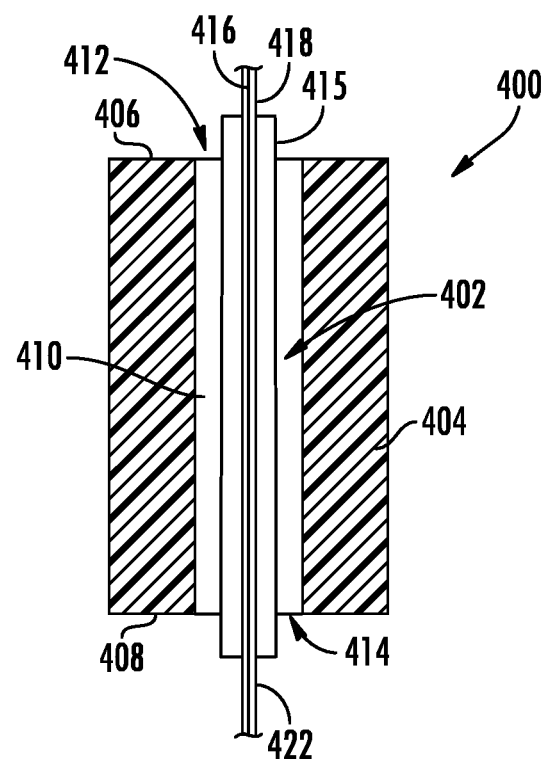
FIG. 1D illustrates a section view of a diffuse reflector according to one or more embodiments shown and described herein.

FIG. 1D shows an embodiment having a tube situated in the cavity of a diffuse reflector. Diffuse reflector 400 includes cavity 402 having sidewall 404 extending from end 406 to end 408. Sidewall 404 has an interior surface 410 facing the interior of the cavity 402. Diffuse reflector 400 further includes opening 406 and opening 408. End 406 includes opening 412 and end 408 includes opening 414. Diffuse reflector 400 further includes a tube 415 situated in cavity 402. Tube 415 is situated within opening 412 and opening 414. The cross-sectional area of tube 415 is less than or equal to the cross-sectional area of cavity 402. Glass fiber 416 has a curable coating composition 418 disposed thereon and passes through cavity 402 within tube 415 past light source 420 to opening 414. Light source 420 provides curing radiation to cure curable coating composition 418 to form coating 422. Interior surface 410 faces glass fiber 416, curable coating composition 418, and coating 422. Glass fiber 416 exits cavity 402 through opening 414 with coating 422 disposed thereon. The interior of tube 415 preferably contains an inert gas (e.g. $N_2$, Ar, He) to shield curable coating composition 418 from oxygen when it is exposed to curing radiation from light source 420 during formation of coating 422. Tube 415 preferably comprises a material with high transparency to the curing radiation. In one embodiment, tube 415 comprises silica glass. One or more light sources (not shown) are integrated with cavity 402.

The diffuse reflector is intended for use in an optical fiber draw process. In the optical fiber draw process, the glass fiber is in continuous motion as it passes through the diffuse reflector. The speed of motion of the glass fiber is referred to herein as "draw speed". In different embodiments, the draw speed of the glass fiber as it passes through the diffuse reflector is greater than 35 m/s, or greater than 40 m/s, or greater than 45 m/s, or greater than 50 m/s, or greater than 55 m/s, or greater than 60 m/s, or in the range from 35 m/s-80 m/s, or in the range from 40 m/s-75 m/s, or in the range from 45 m/s-70 m/s, or in the range from 50 m/s-65 m/s.

In each of the foregoing embodiments, the interior surface of the sidewall of the cavity of the diffuse reflector is formed of, or coated with, a diffuse reflective material. Materials used in mirrors are specular reflective materials. In specular reflection, the angle of reflection equals the angle of incidence. A diffuse reflective material, in contrast, is a material that reflects incident light in non-specular directions. That is, the majority of light incident to a diffuse reflective material is reflected in at an angle other than the angle of incidence. In this regard, diffused reflection may be when reflection occurs at multiple angles different from specular reflection or a single angle that is the same angle as normal as incident light. A preferred mechanism of diffuse reflection is scattering and the diffuse reflective material is also referred to herein as a scattering material. Scattering refers to redirection of light at an angle other than the angle of incidence. The scattering material included with the interior surface of the cavity of the diffuse reflector diffusely reflects or scatters at least 90.0%, or at least 95.0%, or at least 97.0%, or at least 99.0%, or at least 99.5% of incident light in a wavelength range from 200 nm-400 nm, or a wavelength range from 250 nm-400 nm, or a wavelength range from 300 nm-400 nm, or a wavelength range from 325 nm-400 nm, or a wavelength range from 350 nm-400 nm. In a preferred embodiment, the diffuse reflective material scatters incident light to produce reflected light having a Lambertian intensity distribution; that is, the distribution of light intensity emanating from the diffuse reflective material follows, or approximately follows, Lambert's cosine law. The thickness of the diffuse reflective material is at least 0.5 mm, or at least 1.0 mm, or at least 5.0 mm, or at least 10.0 mm, or at least 20.0 mm, or in the range from 0.5 mm-25 mm, or in the range from 1.0 mm-20.0 mm, or in the range from 5.0 mm-15.0 mm.

In one example of sintered silica soot particles, there are multiple interfaces of air and silica due to the porous nature of partially sintered silica particles. Each interface contributes to refraction and partial reflection, which results in multiple events creating uniform distributed light. The efficiency of such diffused reflections and angular distribution is linked to silica particle size distribution and air/silica interfaces. An increase of material density leads to a decrease of the surface area and number of reflection/refraction events, reducing scattering efficiency and angular distribution.

The intensity of light in the cavity depends on the fraction of source light diffusely reflected by the diffuse reflective material of the sidewall. Table 1 summarizes calculated estimates of the light intensity in the interior of cavities configured in different ways. In the calculation, the light intensity was assumed to be uniform throughout the cavity. Each configuration included a cylindrical cavity with length 60 inches (154.4 cm) and an array of 1500 LEDs as a light source. Each LED had a size of 1 mm×1 mm for sidewalls that diffusely reflect light with different efficiency ("sidewall reflectivity"). The LED array was centered at the midpoint of the length of the cavity (see, for example, position of LED array 25 shown in FIG. 1). The calculation further assumed that 30% of the total light output from the LED array was absorbed by a curable coating composition disposed on a glass fiber situated in the cavity. Calculations of intracavity intensity were made for cavities that differed in reflectivity of the LED array, cavity diameter, and sidewall reflectivity. The results show that the intracavity intensity increases as either the LED reflectivity or sidewall reflectivity increases, or as the cavity diameter decreases.

TABLE 1

Calculated Intracavity Intensity

| LED reflectivity | Cavity diameter | Sidewall reflectivity | Intracavity intensity |
|---|---|---|---|
| 50% | 1.0" | 98% | 34% |
| 50% | 1.0" | 99% | 47% |
| 50% | 0.5" | 98% | 47% |
| 90% | 1.0" | 98% | 39% |
| 90% | 0.5" | 99% | 75% |

To increase intracavity intensity, it is desirable to minimize loss of light through the ends of the cavity. As noted, the cavity includes openings to permit entry and exit of a glass fiber. Loss of light through the openings leads to a reduction in intracavity intensity and the efficiency of coupling of light from the light source to the curable coating composition disposed on the glass fiber. Loss of light through the openings of the cavity can be reduced by reducing the diameter or cross-sectional area of the openings. End walls, such as shown in FIG. 1C, are used in some embodiments to reduce the size of the openings at the entrance and exit to the cavity. To minimize losses through absorption by the end walls, it is preferable to form the end walls from a material having high specular or diffuse reflectance, or to coat the end walls with such a material. In one embodiment, the material of the end walls is the same as the material of the sidewall of the cavity. In another embodiment, the surface layer of the end walls is the same as the surface layer of the sidewall of the cavity.

To provide robustness in an industrial environment, the diffuse reflective material should withstand moderately elevated temperatures (e.g., up to 200° C.) and be resistant to contamination, such as outgassing from the curable coating composition as it cures. Materials such as Spectraflect® and Spectralon® have high diffuse reflectivity at visible or infrared wavelengths, but lower diffuse reflectivity in the UV. For curing of curable coating compositions for optical fibers, it is desirable to have a diffuse reflective material with high diffuse reflectivity in the UV.

Partially sintered silica soot is a preferred diffuse reflective material for the diffuse reflector disclosed herein. Partially sintered silica soot has high diffuse reflectivity and low absorption losses over a range of wavelengths extending from 250 nm-1900 nm. Diffuse reflectance with a reflected intensity distribution closely approximating a Lambertian distribution is achievable with partially sintered silica soot.

Silica soot can be prepared by a variety of techniques known in the art. Representative techniques include flame combustion methods, flame oxidation methods, flame hydrolysis methods, OVD (outside vapor deposition), IVD (inside vapor deposition), VAD (vapor axial deposition), double crucible methods, rod-in-tube procedures, cane-in-soot methods, and doped deposited silica processes. A variety of CVD (chemical vapor deposition) and plasma-enhanced CVD processes are known and are suitable for producing silica or doped silica.

Formation of silica soot occurs through reaction or decomposition of a silica precursor. Suitable precursors for silica include organosilanes such as OMCTS (octamethyl-cyclotetrasiloxane) and $SiCl_4$. The silica soot is optionally doped. Doping is accomplished with a doping precursor. The doping precursor can be introduced with the silica precursor in the deposition process or used to treat a porous soot body formed from a silica precursor. Preferred doping precursors include halogen-containing gases such as $SiBr_4$, $Cl_2$, $SiCl_4$, $Si_2Cl_6$, $Si_2OCl_6$, $CCl_4$, $F_2$, $CF_4$, and $SiF_4$.

In the initial state formed upon deposition, silica soot forms a low density (~0.25 g/cm$^3$-0.50 g/cm$^3$) porous body. Low density silica soot has high diffuse reflectivity in the UV and in one embodiment, is formed as a surface layer on the interior surface of a sidewall or an end wall of a cavity to provide diffuse reflectance of light in the cavity. Low density silica soot, however, is fragile, mechanically unstable, and unsuitable for use as a material for a monolithic cavity. To improve mechanical integrity and machinability, low density silica soot is partially sintered to a higher density, lower porosity state. Fully sintered silica has a closed pore structure with a density greater than 1.90 g/cm$^3$. Fully sintered silica, however, is mechanically rigid and difficult to machine. The preferred diffuse reflective material for the cavity of the present disclosure is partially sintered silica soot. As used herein, partially sintered silica soot refers to silica soot having a density in the range from about 0.8 g/cm$^3$ to about 1.8 g/cm$^3$, or in the range from about 1.0 g/cm$^3$ to about 1.8 g/cm$^3$, or in the range from about 0.8 g/cm$^3$ to about 1.5 g/cm$^3$, or in the range from about 0.8 g/cm$^3$ to about 1.3 g/cm$^3$. In one embodiment, partially sintered silica soot is provided as a layer on the interior surface of a sidewall or an end wall of a cavity. In another embodiment, partially sintered silica soot forms a monolithic body that is machined to form a diffuse reflector. Machining, for example, includes removing a portion of the monolithic partially sintered silica soot body to form a cavity with the characteristics described herein.

Partially sintered silica soot is formed by heating silica soot for a sufficient period of time. The sintering temperature must be sufficient for the selected time period to induce densification of silica soot, but not so high as to form the closed pore structure of the fully sintered state. Typical sintering temperatures are in the range from 900° C.-1600° C., or in the range from 1000° C.-1550° C., or in the range from 1100° C.-1500° C. Typical sintering times are in the range from several minutes to several hours. The diffuse reflectivity of partially sintered silica soot at one or more wavelengths in the UV is at least 90%, or at least 95%, or at least 97%, or at least 98%, or at least 99%, or at least 99.5%.

Figure 2:
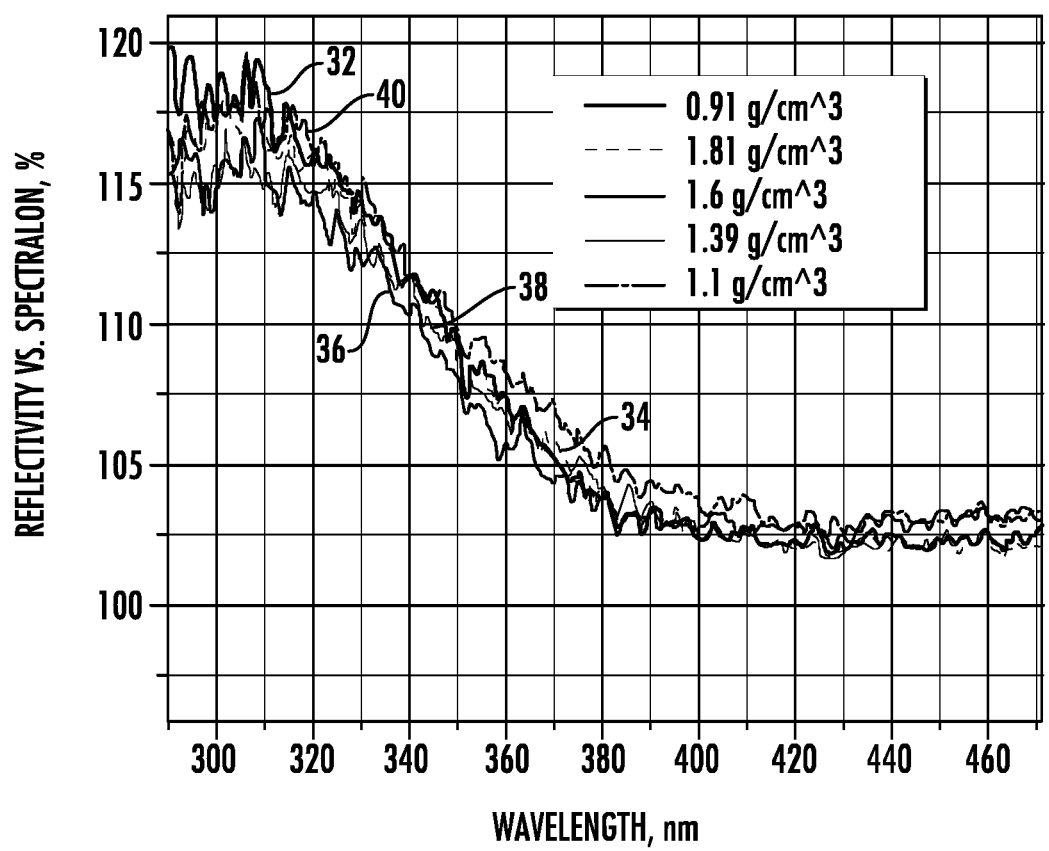
FIG. 2 is a chart showing reflectivity of a diffuse reflector formed of a fused silica soot material, according to one or more embodiments shown and described herein.

FIG. 2 illustrates the diffuse reflectivity of partially sintered silica soot relative to Spectralon® for bulk samples at least 10 mm thick. Results for a range of density of partially sintered silica soot are shown. As can be seen, the partially sintered silica soot has a diffuse reflectivity of greater than or equal to the diffuse reflectivity of Spectralon® over the wavelength range indicated. Line 32 illustrates partially sintered silica soot having a density of 0.91 g/cm³, line 34 illustrates partially sintered silica soot having a density of 1.81 g/cm³, line 36 illustrates partially sintered silica soot having a density of 1.6 g/cm³, line 38 illustrates partially sintered silica soot having a density of 1.39 g/cm³ and line 40 illustrates partially sintered silica soot having a density of 1.1 g/cm³.

Figure 3:
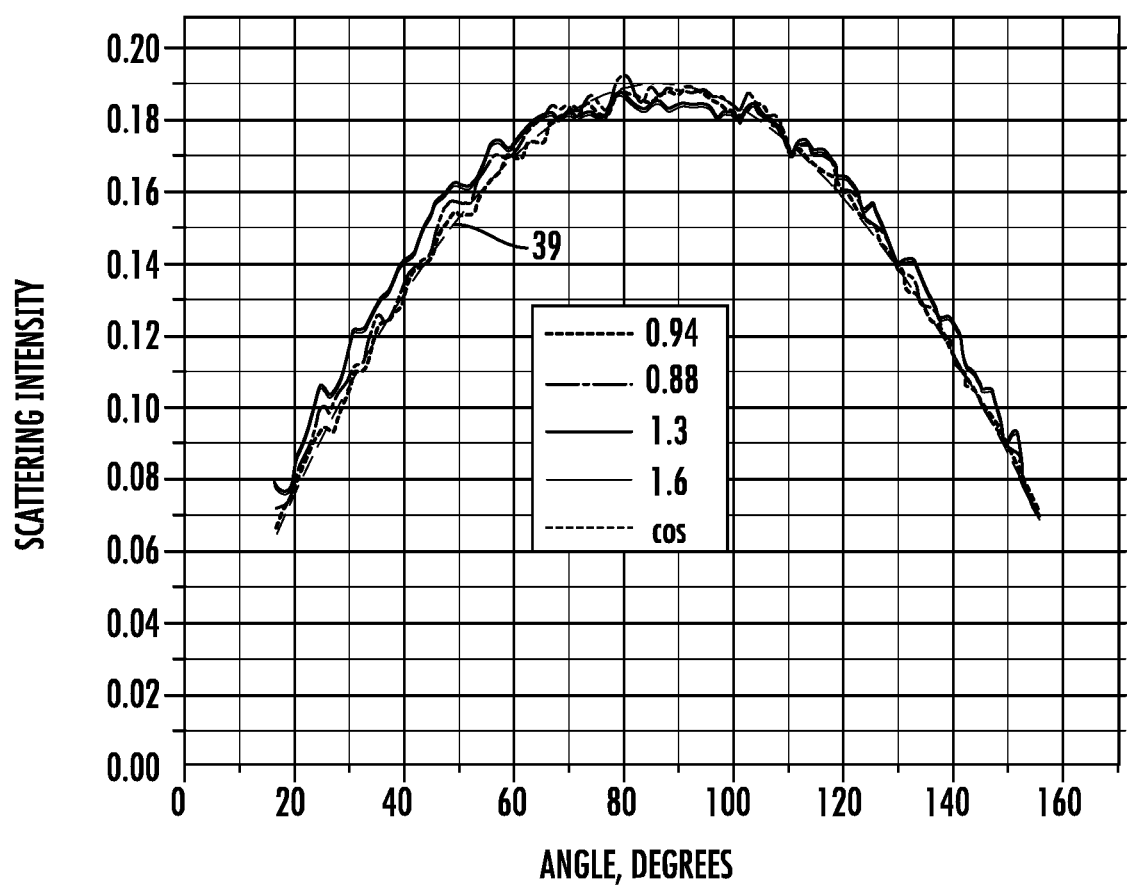
FIG. 3 is a chart of scattering intensity for a diffuse reflector formed of fused silica soot having a density of between 0.88 g/cm$^3$ and 1.6 g/cm$^3$, according to one or more embodiments shown and described herein.

FIG. 3 shows scattering of unpolarized light with a wavelength of 630 nm from planar samples of partially sintered silica soot with densities in the range from 0.88 g/cm³-1.6 g/cm³ over a range of incidence angles, where an incidence angle of 90° corresponds to the direction normal to the surface of the sample and incidence angles of 0° and 180° correspond to directions parallel to the surface of the sample. Scattering is reported as the bidirectional reflectance distribution function (BDRF). FIG. 3 also shows a theoretical scattering curve based on Lambert's cosine law (line 39). The results shown in FIG. 3 indicated that partially sintered silica soot closely approximates a Lambertian reflector.

EXAMPLE

Figure 4:
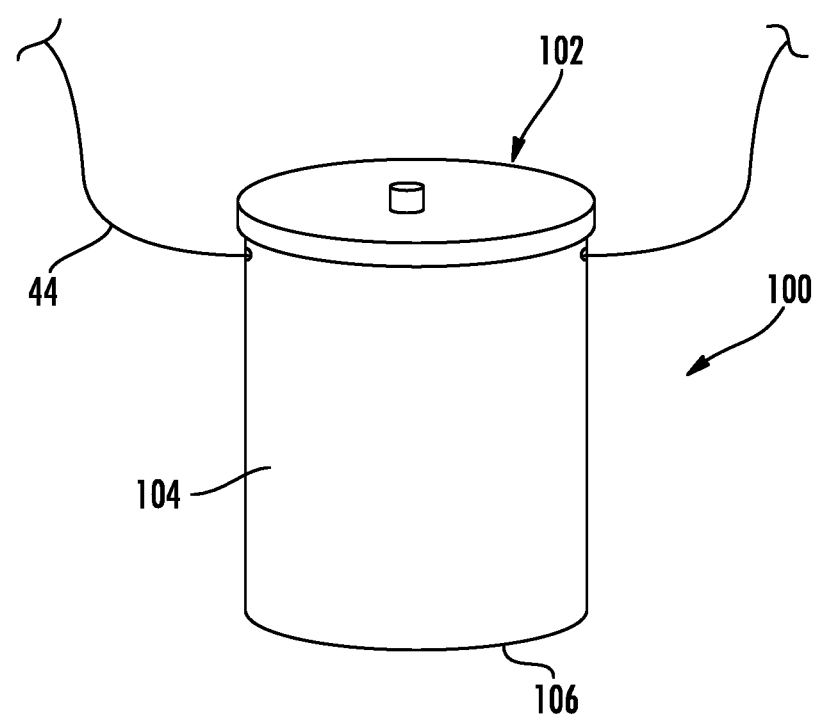
FIG. 4 is a diagrammatic illustration of a reflector body formed of fused silica soot, according to one or more embodiments shown and described herein.

Referring to FIG. 4, the diffuse reflectivity of partially sintered silica soot was measured at 355 nm was measured using the ring down spectroscopy technique described in the article "Diffuse Reflecting Material for Integrated Cavity Spectroscopy, including Ring Down Spectroscopy", by M. T. Cone in Applied Optics, Vol. 54(2), p. 334 (2015). To perform the measurement, an integrated cavity was formed partially sintered silica soot. The cavity was configured as a hollow cylinder 100 with end walls 102 and 106 using partially sintered silica soot with an initial average density of 0.51 g/cm³. Before measurement of diffuse reflectivity, the cavity was thermally treated. The thermal treatment included exposing the cavity to a gas atmosphere consisting of 50/50 vol. percent O₂/He mix for 60 minutes at 1100° C. The gas atmosphere was then switched to 100 percent He for 60 minutes while ramping the temperature of the cavity to 1300° C. The cavity was then held at 1300° C. for 4 hours in 100 percent He. These steps were performed at one atmosphere of gas pressure and resulted in partial sintering of the cavity. After the thermal treatment, the thickness of a sidewall 104 of the cavity 100 was about 10 mm to 15 mm and the density of the partially sintered silica soot was about 1 g/cm³. Cavity 100 had an inner diameter of 64.3 mm and a height of 90.5 mm.

Figure 5:
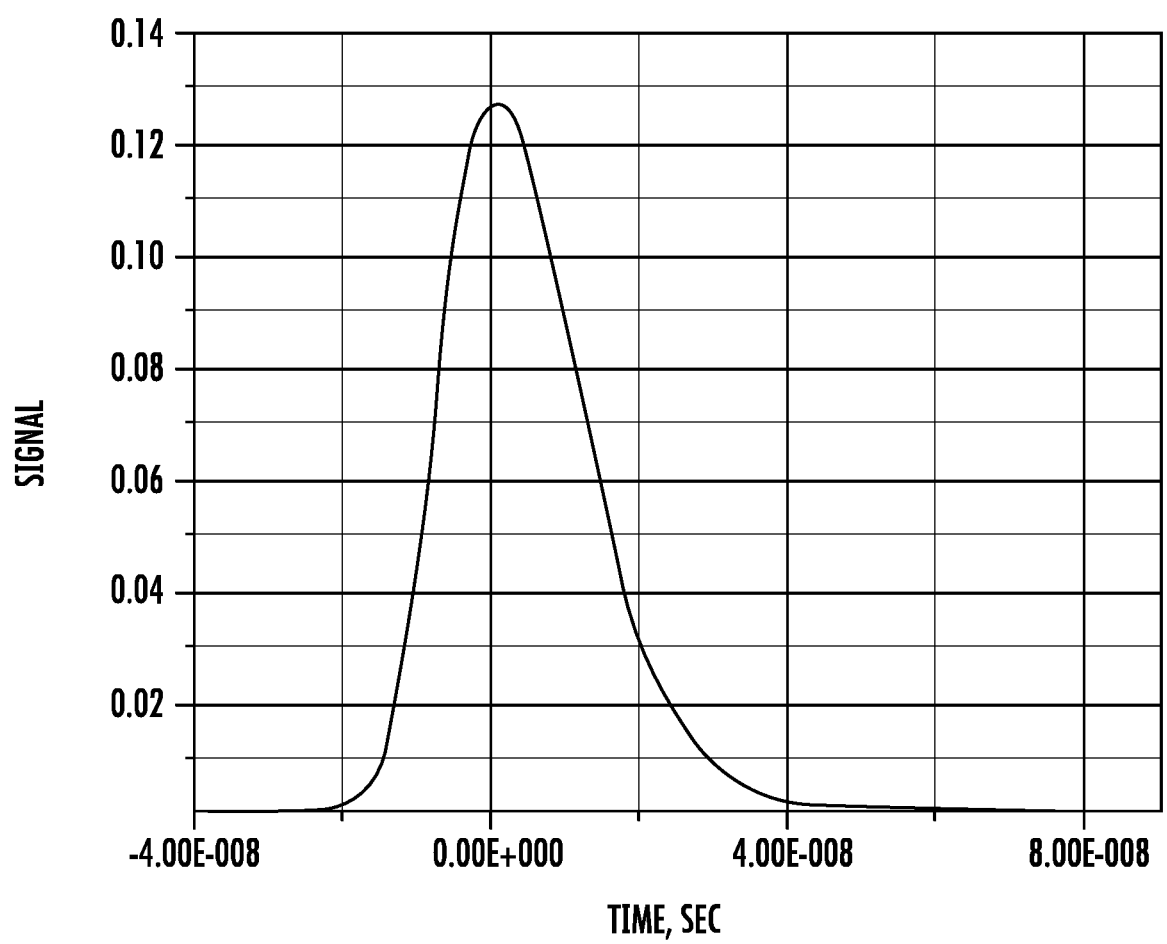
FIG. 5 is a chart of pulse duration for light delivered to the reflector body of FIG. 4 under a test condition, according to one or more embodiments shown and described herein.

In the ring down spectroscopy method, a pulse of light is introduced into a cavity and the pulse duration of light exiting the cavity is measured. The increase in pulse duration of the exit pulse relative to the initial pulse provides a measure of the diffuse reflectivity of the interior surface of the cavity walls. The output pulse duration increases as the diffuse reflectivity of the interior surface of the cavity increases according to $$T = \left(\frac{1}{-\ln r}\right)\left(\frac{4V}{Sc}\right)$$

where, T is the duration of the output pulse, V is the volume of the cavity, S is the area of the interior surface of the sidewall 104, c is the speed of light and r is the reflectivity of the interior surface of the sidewall 104. The input pulse was provided by a Q-switched Nd-YAG laser. The $3^{rd}$ harmonic (355 nm) was used and the initial pulse duration was about 10 ns. The input was coupled to the cavity 100 through 300 μm silica glass fiber 44 and the output pulse was collected through a second fiber 46 and directed to a photomultiplier (PMT) tube coupled to a digital oscilloscope with 1 GHz bandwidth for detection. The waveform of the output pulse was measured and is shown in FIG. 5. Deconvolution of the waveform indicated that the duration of the output pulse was 20 ns. Using the formula above, the diffuse reflectivity of the interior surface of sidewall 104 was determined to be 0.992 at 355 nm.

Figure 6:
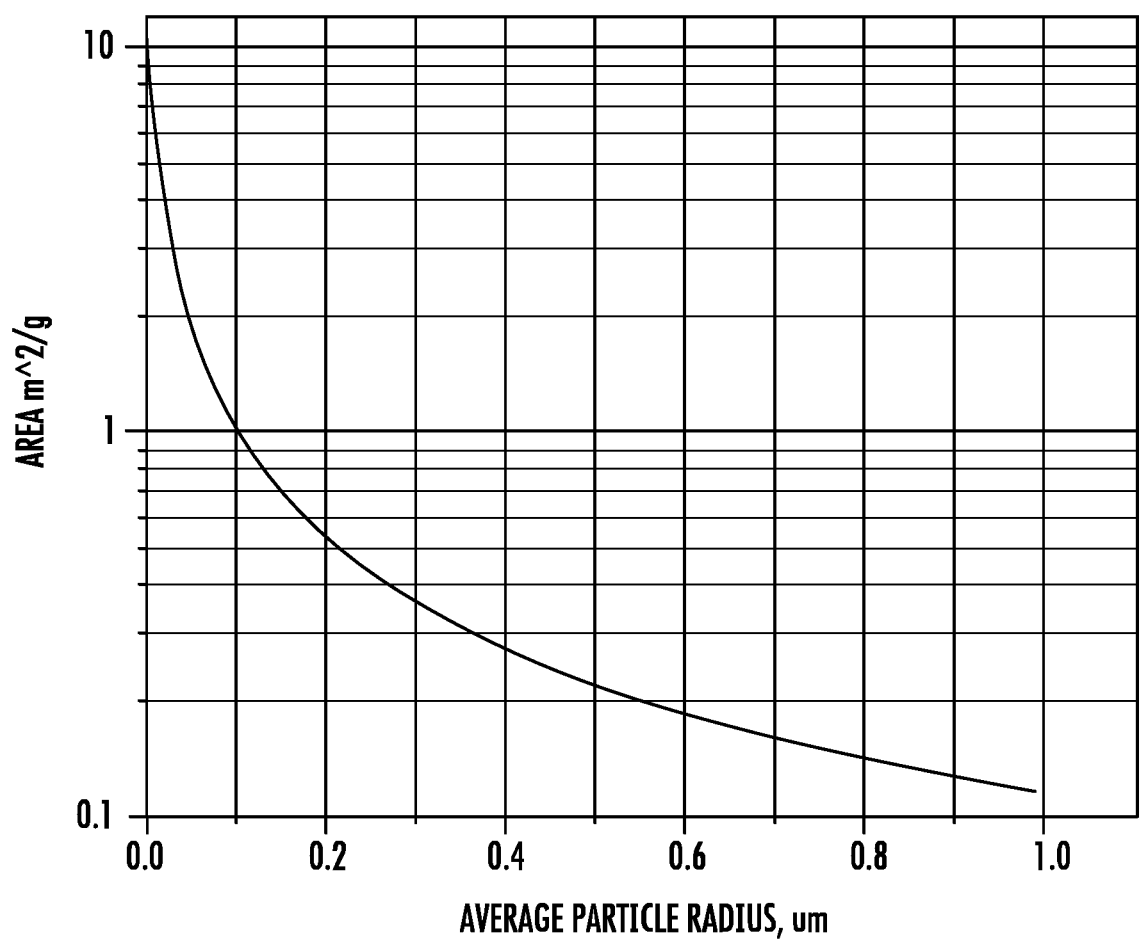
FIG. 6 is a chart of soot surface area as a function of particle radius for soot consisting of round particles of uniform size, according to one or more embodiments shown and described herein.

In one embodiment, the partially sintered silica soot is formed of particles with the particles having an average particle diameter of 20 nm or greater or 100 nm or greater, or 200 nm or greater, or 400 nm or greater, or in the range from 20 nm-800 nm, or in the range from 50 nm-600 nm, or in the range from 100 nm-500 nm, and a surface area of less than 10 m²/g, or less than 5 m²/g, or less than 1 m²/g. FIG. 6 illustrates soot surface area as a function of particle radius for soot consisting of round particles of uniform size. As can be seen, surface area (m²/g) decreases as average particle size (μm) increases. As the density of partially sintered silica soot increases, the average particle size increases and the surface area decreases. Despite the larger average particle size of partially sintered silica soot, high reflectivity in the UV and nearly Lambertian scattering properties are observed (FIGS. 2 and 3).

Figure 7:
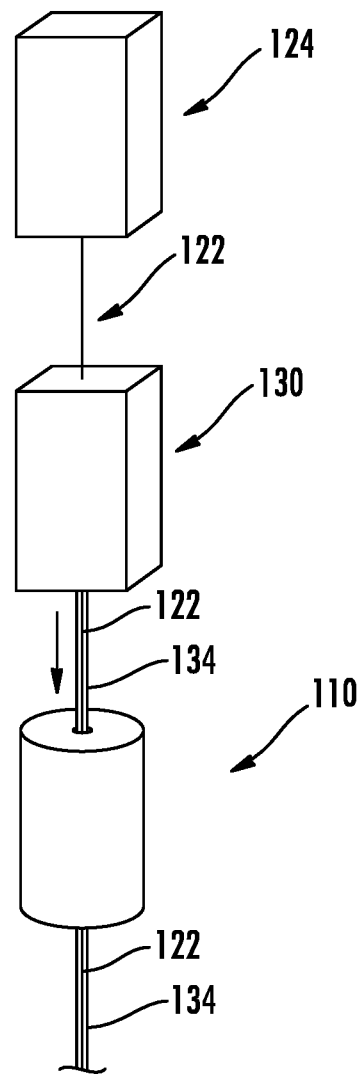
FIG. 7 illustrates a method and system of forming, coating and curing optical fibers including optical fiber coatings using diffuse reflector apparatuses, according to one or more embodiments shown and described herein.

Referring now to FIG. 7, a diffuse reflector apparatus 110 is used to cure a curable coating composition 128 that is disposed on a glass fiber 122 drawn by an optical fiber drawing apparatus 124 (e.g., a draw tower or draw furnace). The optical fiber drawing apparatus 124 may be used to draw the glass fiber 122. After the draw, a radiation-curable coating composition 128 is applied to glass fiber 122 at a coating apparatus 130 (e.g. coating die). In some embodiments, the coating apparatus 130 is separate from the optical fiber drawing apparatus 124. In other embodiments, the coating apparatus 130 is part of the optical fiber drawing apparatus 124. The glass fiber 122 is delivered to the coating apparatus 130 directly from the optical fiber drawing apparatus 124 in a continuous fashion. In other embodiments, the optical fiber 122 is delivered to the coating apparatus 130 from a source other than a draw tower or draw furnace, such as from a spool, in a continuous fashion (e.g. offline coating). A suitable curable coating composition is an acrylate-based composition which is curable by exposure to UV light. This material can be applied to the surface of the glass fiber 122 in a liquid state and subsequently exposed to UV light for curing in diffuse reflector 110. The curable coating composition may be applied in one or more layers, such as a two-layer coating system. A primary coating may be applied directly to the surface of the glass fiber 122, and a secondary coating may be applied over the primary coating as an example.

Figure 8:
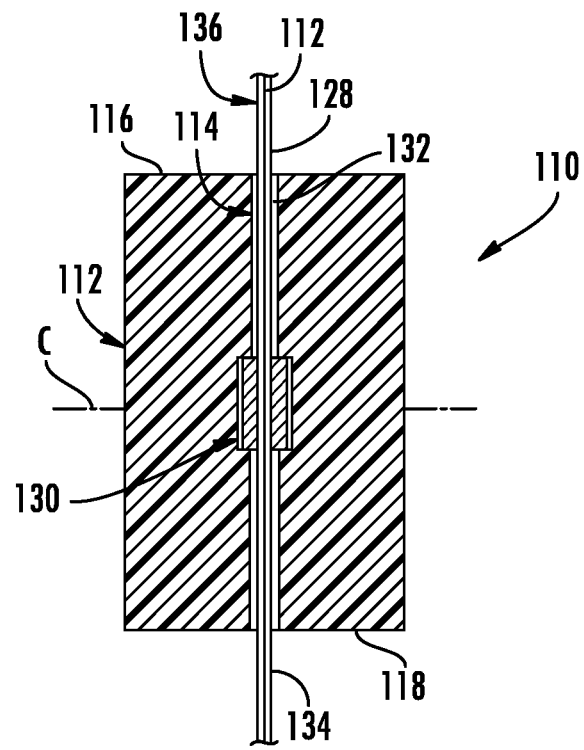
FIG. 8 illustrates a section view of a diffuse reflector apparatus for the method of FIG. 7, according to one or more embodiments shown and described herein.

The glass fiber 122 with curable coating composition 128 disposed on a surface thereof is delivered to the diffuse reflector apparatus 110. In some embodiments, the glass fiber 122 with the curable coating composition 128 disposed thereon is delivered directly from the coating apparatus 130 to the diffuse reflector apparatus 110 in a continuous fashion. Referring also to FIG. 8, the glass fiber 122 with the curable coating composition 128 disposed thereon is inserted into a cavity 114 of the diffuse reflector apparatus 110. As above with FIG. 1, the diffuse reflector apparatus 110 includes a reflector body 112 having the cavity 114 that extends between opposite ends 116 and 118 of the reflector body 112. The cavity 114 may be circular in cross-sectional shape having a diameter of no greater than about 1 inch (25.4 mm), such as not greater than about 0.5 inch (12.7 mm). The reflector body 112 may be formed with, or have a surface layer formed with, partially sintered silica soot having a density as discussed above.

The reflector body 112 may include an array of LEDs 130 that provide electromagnetic energy in the form of UV light. For example, the reflector body 112 may include 1000 or more LEDs, such as 1500 or more LEDs that are packed in an array that can be centered about a center line C of the reflector body 112. The LEDs are integrated with reflector body 112 and/or an interior surface of the cavity 114. In one embodiment, an interior surface 132 of the cavity 114 includes openings in which one or more LEDs or LED arrays are situated. Sections of the glass fiber 122 with curable coating composition 128 disposed thereon are introduced to the cavity 114 to be cured using the light, such as UV light, supplied by the LEDs or LED arrays. The partially sintered silica soot of the reflector body 112 provides interior surface 132 as a surface for diffuse reflection that provides an even distribution of diffusely reflected light, as described above. As the curable coating composition 128 is cured, an adjacent section 136 of the glass fiber 122 with curable coating composition 128 disposed thereon can be introduced to the cavity 114 for a curing operation in a continuous fashion. The term "continuous fashion" means that multiple sections of the glass fiber 122 with curable coating composition disposed thereon are delivered to the diffuse reflector apparatus 110 in succession without discontinuing the curing process. After curing, the glass fiber 122 with coating 134 may be stored, for example, by winding around a spool. While a single reflector body 112 is illustrated, the diffuse reflector apparatus 110 may include multiple reflector bodies.

Figure 9:
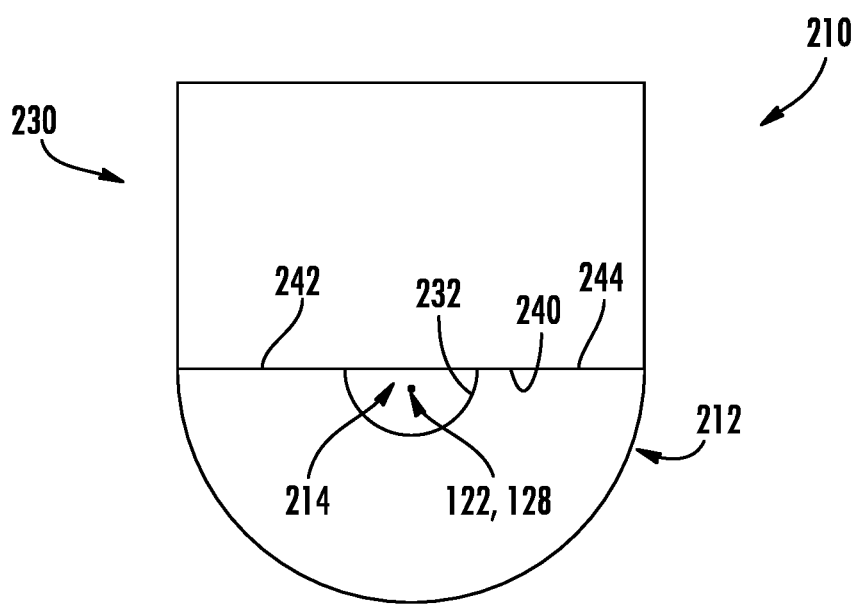
FIG. 9 is a diagrammatic, section view of another diffuse reflector apparatus formed of a fused silica soot for curing optical fiber coatings, according to one or more embodiments shown and described herein.

Referring to FIG. 9, another embodiment of a diffuse reflector apparatus 210 includes a reflector body 212 and, in this embodiment, an LED lamp 230 provides a UV light source to a cavity 214 provided by the reflector body 212. A suitable UV lamp is commercially available from Phoseon Technology, Inc. The reflector body 212 is illustrated as a half of a cylinder (and may alternatively be another annular shape having an open cross-section that provides an opening for integration of a light source) that is divided lengthwise in a plane that is parallel to a long axis of the cavity. The cylinder preform (i.e., before dividing) may be formed similar to the reflector body 112 of FIG. 7 with a partially sintered silica soot that provides an even distribution of light reflected therefrom. Due, at least in part to the density of the partially sintered silica soot of between 0.8 g/cm$^3$ and 1.8 g/cm$^3$, the reflector body 212 can be machined in half (or otherwise cut) without damaging the structural integrity of the reflector body 212.

The LED lamp 230 has an emitter surface 240 that is seated against sides 242 and 242 of the cavity 214. The emitter surface may be positioned relative to the cavity 214 to direct light energy directly into the cavity 214. As above, sections of the glass fiber 122 with curable coating composition 128 disposed thereon are introduced to the cavity 214 for curing using the UV light supplied by the LED lamp 230. The partially sintered silica soot of the reflector body 212 provides interior surface 232 as a diffuse reflective surface. As the curable coating composition 128 is cured, an adjacent section of the glass fiber 122 with curable coating composition 128 disposed thereon can be introduced to the cavity 214 for a curing operation. After curing, the glass fiber 122 with coating 134 may be stored, for example, by winding around a spool.

It should be noted that while a single reflector body is described above, the diffuse reflector apparatus 210 may include multiple reflector bodies that are placed end-to-end to form a cavity. Further, multiple LED lamps may be used and placed side-by-side.

Example

A reflector body was formed from partially sintered silica soot having a density of about 1 g/cm$^3$ and an inner diameter of 1.5 inches (3.8 cm) for the cavity. The reflector body was sliced in half, as shown by FIG. 9, to expose the cavity and the cavity was integrated with a 10 mm wide Phoseon LED lamp (model FirePower FP300 225X20WC395-20W-FCL) operating at a wavelength of 385 nm, hereinafter referred to as a commercially available LED lamp. The reflectivity of the non-emitting commercially available LED lamp surface (the surface surrounding the individual LED elements) was measured (FIG. 10) and was determined to be about 60 percent between 300 nm and 500 nm.

Figures 11, 12:
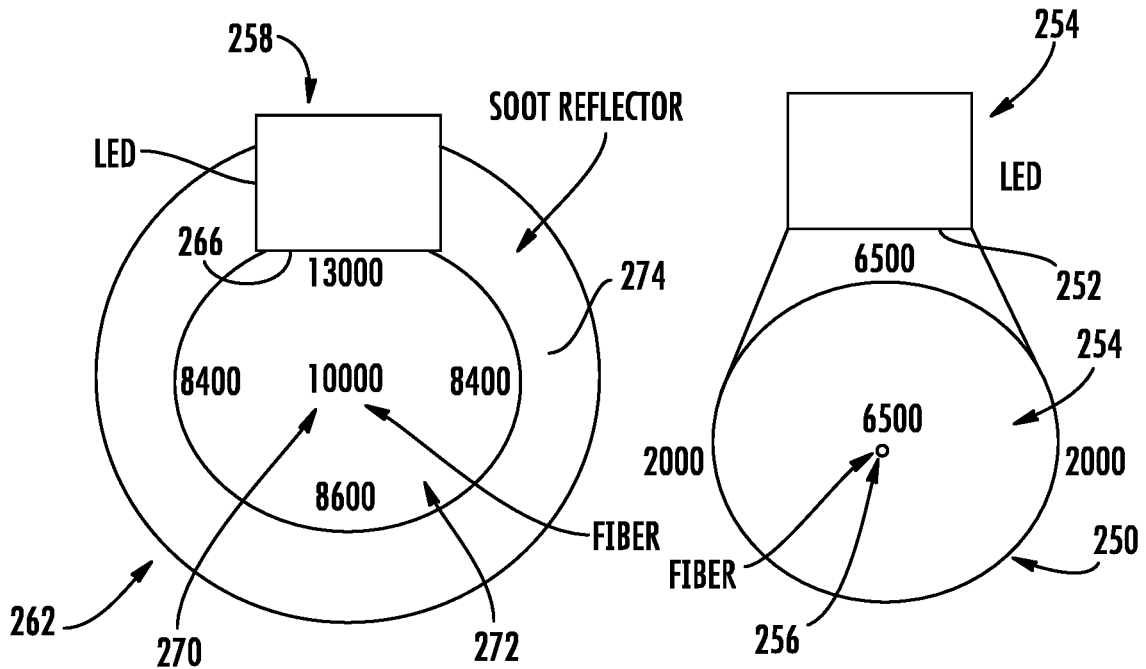
FIG. 11 represents light intensity measurements under testing conditions using a diffuse reflector apparatus formed of a fused silica soot, according to one or more embodiments shown and described herein.
FIG. 12 represents light intensity measurements under testing conditions using a commercially available reflector, according to one or more embodiments shown and described herein.

Measurements of light intensity were taken with a probe at different locations in two embodiments of the cavity of a diffuse reflector. FIGS. 11 and 12 represent intensity distribution measurements in a cavity 272 of a diffuse reflector 262 made from partially sintered fused silica having a density of about 1 g/cm$^3$ (FIG. 11) and a cavity 254 of a diffuse reflector 250 made from a specular reflective material (a metal) (FIG. 12). Both cavities had a diameter of 1.5 inches (3.8 cm) and were equipped with the commercially available LED lamp. The numerical values shown in the cavities of FIGS. 11 and 12 are reflective units that are proportional to the intensity of light at different positions within the cavity. The intensity at the center and interior surfaces of cavity 272 are much higher than at the corresponding positions of cavity 254. The distribution of intensity within cavity 272 is also much more uniform than in cavity 254. The higher and more uniform distribution of intensity in cavity 272 is attributable to the high diffuse reflectivity of the partially sintered silica soot that form the interior surfaces of cavity 272.

Figure 10:
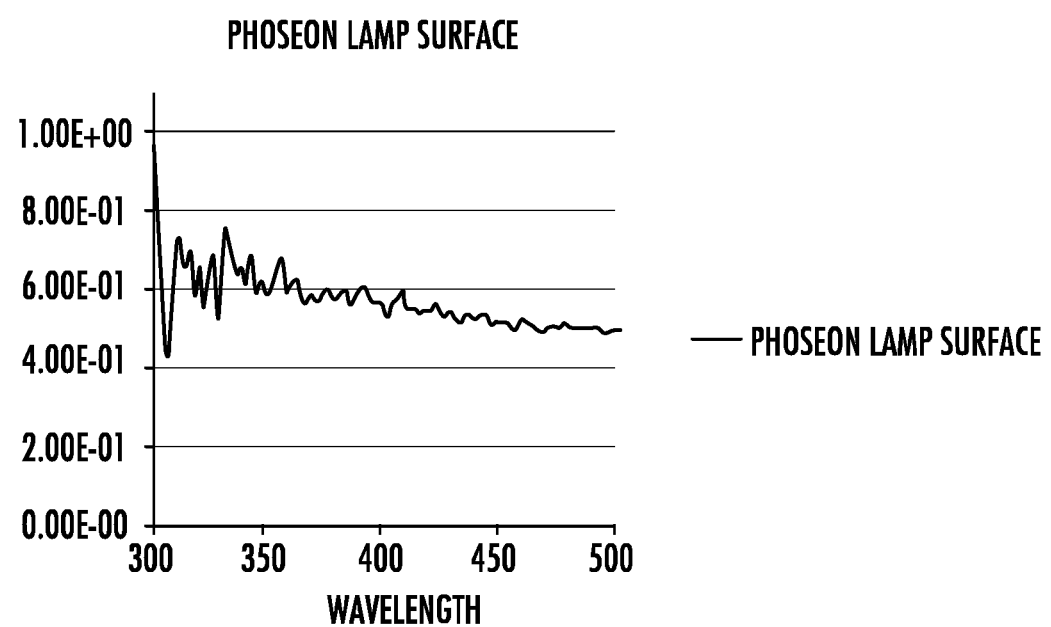
FIG. 10 is a chart of reflectivity of a lamp surface at an emitter surface of the lamp, according to one or more embodiments shown and described herein.
Figure 13:
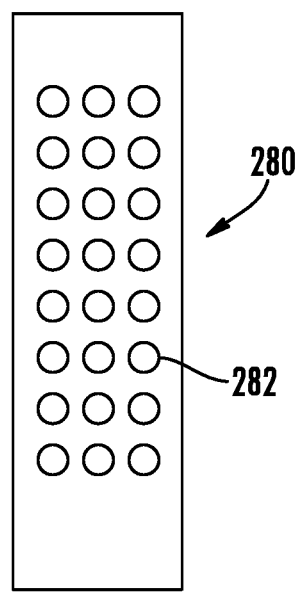
FIG. 13 is a diagrammatic illustration of a reflector plate for use with the diffuse reflector apparatus of FIG. 9, according to one or more embodiments shown and described herein.

As shown in FIG. 10, the reflectivity of the material surrounding the individual LEDs of an LED source is relatively low (about 60%). Higher cavity intensity can be realized by increasing the reflectivity of material surrounding the LEDs. This can be accomplished by modifying the LED source to use materials with higher reflectivity as the material surrounding the LED, or by superimposing a mask made from a high reflectivity material over the LED source. FIG. 13 shows a reflecting plate 280 for placement over the surface of an LED source to improve reflectivity of the LED source. The reflecting plate 280 is provided with openings or UV transparent windows 282 to provide portals through which the UV light from the LEDs can pass freely from the LEDs or LED arrays to the cavity 272. In some embodiments, the same or similar diffuse reflecting material is used to form the plate 280 as is used to form the body enclosing the cavity of the diffuse reflector. In one embodiment, plate 280 is formed from partially sintered silica soot, from a substrate with a surface layer of partially sintered silica soot, or a substrate with a surface layer of silica soot having a density less than 0.50 g/cm$^3$, or a density less than 0.40 g/cm$^3$, or a density less than 0.30 g/cm$^3$.

The partially sintered silica soot of the reflector body forms a diffuse reflective surface that provides an even distribution of light reflected therefrom within its cavity for curing coating compositions for optical fiber coatings. Providing the reflector bodies with higher densities renders them more easily machinable and stable unlike less sintered or just pressed silica soot, while maintaining a majority of the reflective properties (e.g., reflectivity as high as 0.995 in visible wavelength range and greater than 0.99 in UV range). While the reflector bodies described above are cylindrical in shape, the bodies may be other shapes, such as box-shaped (e.g., cubes) with a round (e.g., circular) cavity extending between ends of the reflector body. It should be noted that while LEDs are described primarily above, the diffuse reflector apparatuses may be used with other high-brightness sources, such as lasers.

Clause 1 of the present disclosure extends to:
An apparatus for curing a coating composition disposed on a glass fiber, comprising:
 a diffuse reflector surrounding a coating composition disposed on a glass fiber, the diffuse reflector defining a cavity having a sidewall extending from a first end to a second end, the first end having a first opening and the second end having a second opening, the glass fiber passing through the cavity from the first opening to the second opening, the sidewall having an interior surface facing the coating composition disposed on the glass fiber, the interior surface comprising a scattering material; and
 a light source integrated with the diffuse reflector, the light source directing light to the scattering material, the scattering material diffusely reflecting at least 90% of the light, the diffusely reflected light having sufficient intensity to cure the coating composition.

Clause 2 of the present disclosure extends to:
The apparatus of clause 1, wherein the coating composition is disposed as a layer having a thickness in the range from 5 µm-50 µm on the glass fiber.

Clause 3 of the present disclosure extends to:
The apparatus of clause 1 or 2, wherein the coating composition comprises an acrylate compound.

Clause 4 of the present disclosure extends to:
The apparatus of any of clauses 1-3, wherein the glass fiber has a diameter less than 200 µm.

Clause 5 of the present disclosure extends to:
The apparatus of any of clauses 1-4, wherein the first end comprises a first end wall, the first end wall comprising the first opening.

Clause 6 of the present disclosure extends to:
The apparatus of clause 5, wherein the first end wall has a surface comprising the scattering material.

Clause 7 of the present disclosure extends to:
The apparatus of clause 5 or 6, wherein the first opening has a cross-sectional area less than a cross-sectional area of cavity.

Clause 8 of the present disclosure extends to:
The apparatus of any of clauses 5-7, wherein the second end comprises a second end wall, the second end wall comprising the second opening.

Clause 9 of the present disclosure extends to:
The apparatus of clause 8, wherein the first end wall and the second end wall have a surface comprising the scattering material.

Clause 10 of the present disclosure extends to:
The apparatus of clause 8 or 9, wherein the first opening and the second opening have cross-sectional areas less than a cross-sectional area of the cavity.

Clause 11 of the present disclosure extends to:
The apparatus of any of clauses 1-10, wherein the light is UV light, the UV light having a wavelength in the range from 300 nm-400 nm.

Clause 12 of the present disclosure extends to:
The apparatus of any of clauses 1-11, wherein the scattering material comprises partially sintered silica soot, the partially sintered silica soot having a density in the range from 0.8 g/cm$^3$-1.8 g/cm$^3$.

Clause 13 of the present disclosure extends to:
The apparatus of any of clauses 1-11, wherein the scattering material comprises partially sintered silica soot, the partially sintered silica soot having a density in the range from 1.0 g/cm$^3$-1.8 g/cm$^3$.

Clause 14 of the present disclosure extends to:
The apparatus of any of clauses 1-11, wherein the scattering material comprises partially sintered silica soot, the partially sintered silica soot having a density in the range from 0.8 g/cm$^3$-1.5 g/cm$^3$.

Clause 15 of the present disclosure extends to:
The apparatus of any of clauses 1-11, wherein the diffuse reflector consists essentially of the scattering material.

Clause 16 of the present disclosure extends to:
The apparatus of any of clauses 1-15, wherein the light source comprises a light-emitting diode.

Clause 17 of the present disclosure extends to:
The apparatus of clause 16, wherein the light-emitting diode emits light at a wavelength in the range from 200 nm-400 nm.

Clause 18 of the present disclosure extends to:
The apparatus of clause 16 or 17, wherein the light source comprises an array of the light-emitting diodes, the array comprising a material surrounding the light-emitting diodes.

Clause 19 of the present disclosure extends to:
The apparatus of clause 18, further comprising a reflective plate disposed on the material surrounding the light-emitting diodes, the reflective plate comprising a material having a diffuse reflectivity of at least 90% of the light and comprising openings, the openings permitting transmission of the light through the reflective plate.

Clause 20 of the present disclosure extends to:
The apparatus of any of clauses 1-19, wherein the light source is integrated with the sidewall, the integration including placing the light source in an opening of the sidewall.

Clause 21 of the present disclosure extends to:
The apparatus of any of clauses 1-20, wherein the cavity is configured as a cylinder, the cylinder having a diameter no greater than 1 inch.

Clause 22 of the present disclosure extends to:
The apparatus of clause 21, wherein the cylinder has a diameter no greater than 0.5 inch.

Clause 23 of the present disclosure extends to:
The apparatus of any of clauses 1-20, wherein the cavity is configured as an annulus, the annulus comprising an opening in the sidewall.

Clause 24 of the present disclosure extends to:
The apparatus of clause 23, wherein the light source is positioned in the opening of the sidewall.

Clause 25 of the present disclosure extends to:

The apparatus of any of clauses 1-24, wherein the cavity has a length greater than 50 cm.

Clause 26 of the present disclosure extends to:

The apparatus of any of clauses 1-25, wherein the diffusely reflected light has a Lambertian intensity distribution.

Clause 27 of the present disclosure extends to:

The apparatus of any of clauses 1-26, wherein the scattering material diffusely reflects at least 95% of the light.

Clause 28 of the present disclosure extends to:

The apparatus of any of clauses 1-26, wherein the scattering material diffusely reflects at least 98% of the light.

Clause 29 of the present disclosure extends to:

The apparatus of any of clauses 1-26, wherein the scattering material diffusely reflects at least 99% of the light.

Clause 30 of the present disclosure extends to:

The apparatus of any of clauses 1-29, wherein the glass fiber passes through the cavity at a speed of at least 40 m/s.

Clause 31 of the present disclosure extends to:

The apparatus of any of clauses 1-30, further comprising a tube, the tube passing through the cavity from the first opening to the second opening and surrounding the coating composition.

Clause 32 of the present disclosure extends to:

A method of curing a coating composition on a glass fiber, comprising:

directing a glass fiber through an opening into a cavity of a diffuse reflector, the glass fiber having a coating composition disposed thereon, the cavity having an interior surface comprising a scattering material; and directing light to the coating composition, the directing including diffusely reflecting the light from the scattering material, the scattering material having a diffuse reflectivity of at least 90% at a wavelength of the light, the diffusely reflected light having sufficient intensity to cure the coating composition.

Clause 33 of the present disclosure extends to:

The method of clause 32, wherein the glass fiber is directed at a speed of at least 40 m/s through the opening.

Clause 34 of the present disclosure extends to:

The method of clause 32 or 33, wherein the coating composition comprises an acrylate compound.

Clause 35 of the present disclosure extends to:

The method of any of clauses 32-34, wherein the cavity comprises partially sintered silica soot, the partially sintered silica soot having a density in the range from 0.8 g/cm$^3$-1.8 g/cm$^3$.

Clause 36 of the present disclosure extends to:

The method of any of clauses 32-35, wherein the diffusely reflected light has a Lambertian distribution.

Clause 37 of the present disclosure extends to:

The method of any of clauses 32-36, wherein the scattering material has a diffuse reflectivity of at least 95% at the wavelength of the light.

Clause 38 of the present disclosure extends to:

The method of any of clauses 32-36, wherein the scattering material has a diffuse reflectivity of at least 99% at the wavelength of the light.

Clause 39 of the present disclosure extends to:

The method of any of clauses 32-36, wherein the wavelength of the light is in the range from 200 nm-400 nm.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. An apparatus for curing a coating composition disposed on a glass fiber, comprising:

a diffuse reflector surrounding a coating composition disposed on a glass fiber, the diffuse reflector defining a cavity having a sidewall extending from a first end to a second end, the first end having a first opening and the second end having a second opening, the glass fiber passing through the cavity from the first opening to the second opening, the sidewall having an interior surface facing the coating composition disposed on the glass fiber, the interior surface comprising a scattering material, wherein the scattering material comprises partially sintered silica soot, the partially sintered silica soot having a density in the range from 0.8 g/cm$^3$-1.5 g/cm$^3$; and a light source integrated with the diffuse reflector, the light source configured to direct light to the scattering material, the scattering material configured to diffusely reflect at least 90% of the light, the diffusely reflected light having sufficient intensity to cure the coating composition.

2. The apparatus of claim 1, wherein the coating composition comprises an acrylate compound.

3. The apparatus of claim 1, wherein the first end comprises a first end wall, the first end wall comprising the first opening.

4. The apparatus of claim 3, wherein the first end wall has a surface comprising the scattering material.

5. The apparatus of claim 1, wherein the light is UV light, the UV light having a wavelength in a range from 300 nm-400 nm.

6. The apparatus of claim 1, wherein the light source comprises a light-emitting diode, the light-emitting diode emitting light at a wavelength in the range from 200 nm-400 nm.

7. The apparatus of claim 6, wherein the light source comprises an array of the light-emitting diodes, the array comprising a material surrounding the light-emitting diodes and a reflective plate disposed on the material surrounding the light-emitting diodes, the reflective plate comprising a material having a diffuse reflectivity of at least 90% of the light and comprising openings, the openings permitting transmission of the light through the reflective plate.

8. The apparatus of claim 1, wherein the light source is integrated with the sidewall, the integration including placing the light source in an opening of the sidewall.

9. The apparatus of claim 1, wherein the cavity is configured as a cylinder, the cylinder having a diameter no greater than 1 inch.

10. The apparatus of claim 1, wherein the cavity is configured as an annulus, the annulus comprising an opening in the sidewall.

11. The apparatus of claim 1, wherein the diffusely reflected light has a Lambertian intensity distribution.

12. The apparatus of claim 1, wherein the scattering material diffusely reflects at least 95% of the light.

13. The apparatus of claim 1, wherein the glass fiber passes through the cavity at a speed of at least 40 m/s.

14. The apparatus of claim 1, further comprising a tube, the tube passing through the cavity from the first opening to the second opening and surrounding the coating composition.

* * * * *